Patented Mar. 24, 1953

2,632,743

UNITED STATES PATENT OFFICE 2,632,743

FIRE-RESISTANT COATING COMPOSITION FOR FIBERBOARD AND THE LIKE

Lewis W. Eckert, Lancaster Township, Lancaster County, Pa., assignor to Armstrong Cork Company, Lancaster, Pa., a corporation of Pennsylvania No Drawing. Application January 19, 1952, Serial No. 267,310

9 Claims. (Cl. 260—17.3)

This invention relates to a fire-resistant coating composition for fiberboard and the like. The composition is useful on various building materials, such as fiberboard, acoustical units, panel, plank, and tile elements and other members which are installed as decorative interior finishes.

Fiberboard and similar insulating materials made from organic fibers are capable of supporting combustion and burn quite rapidly when ignited. In order to render such products fire-resistant, a coating composition which is applied to them must be nonflammable and should intumesce and coke upon the application of a flame to form a heat-insulating carbon deposit which will prevent the transfer of heat to the flammable body of the board, thus preventing its ignition. In acoustical materials, where closely spaced openings are provided extending from the surface of the board inwardly, there is a problem of preventing the applied flame from igniting the fibers within the openings, such fibers being uncoated. With such materials it is desirable to provide a coating material which will intumesce to a degree adequate to bridge effectively the openings in the board.

Fiberboards, particularly the panel, plank, and tile elements, are sold in a highly competitive market; and it is necessary, therefore, that the coating composition applied to render such elements fire-resistant be inexpensive.

An object of the present invention is to provide a coating composition for fiberboard and the like which will be substantially nonflammable and which will intumesce and coke upon the application of a flame to form an insulating layer of nonflammable material, protecting the fiberboard against ignition.

A further object of the invention is to provide a fire-resistant coating composition of the type described, which may be applied with conventional equipment at low cost and will provide a decorative surface.

An additional object is to provide a fire-resistant coating composition which when used on perforated acoustical units of flammable material will possess the characteristic of sufficient intumescence to adequately bridge the perforations extending to the surface of the material to prevent ignition of the fibers within the openings upon the application of a flame to the surface of the board.

Other objects of the invention will become apparent from the description of certain specific embodiments of the invention which follow.

According to the present invention there are combined monocalcium phosphate, starch, and a binder. The binder may be any one of a number of materials possessing binding properties. Preferably, a portion at least of the starch is in the form of a gelled solution, the remaining starch being present as an ungelled dispersion of starch particles, commonly referred to as dispersion of dry starch, the gelled starch solution serving as a binder. Other binders which may be used include urea-aldehyde resins, phenol-aldehyde resins, phenol modified resorcinol-aldehyde resins, melamine-aldehyde resins, and dicyandiamide-aldehyde resins. Dextrine, soya flour, drying oil, and carboxymethyl cellulose may also be used. The particular binder selected will depend upon the conditions to which the material will be subjected in service, the type of product to be treated, and other variable factors. For instance, in services where high humidity conditions are encountered over prolonged periods, the urea-aldehyde resin binders will not be preferred because of their tendency to deteriorate under such conditions. Where cost is a substantially important factor, the cheaper gelled starch binder will be used in place of the more expensive binders. Where bridging of void space in the coated product upon ignition is an important consideration, a binder which intumesces is preferred, such as a dicyandiamide-aldehyde resin. Other service conditions may best be met by employing a combination of materials as the binder, such as gelled starch and one or more of the resin binders referred to above. Other binders will suggest themselves to those skilled in the art; and, since there is no requirement that there be any chemical reaction between the calcium phosphate-starch mixture and the binder, the field of useful binders is wide, and the selection of the binder is of no unusually critical significance.

For uses such as on perforated acoustical material mentioned above, there may be combined with the monocalcium phosphate and starch a dicyandiamide-aldehyde resin and phosphoric acid, such a resin and acid combination providing an additional intumescent component in the coating composition, which also serves as a supplemental binder for the gelled starch or may serve as the binder if no gelled starch is used.

The monocalcium phosphate is a water insoluble salt, which fire-proofs the starch solution and minimizes the possibility of paint failure which might occur under high humidity conditions. The following is an example of fire-resistant coating composition which may be applied to fiberboard:

*Example I*

| | Parts by weight |
|---|---|
| 15% starch solution | [1] 35.0 |
| Dry ungelled starch | 18.7 |
| Monocalcium phosphate | 12 |
| Phosphoric acid | 3.0 |
| Pigment | 3.2 |
| Filler | 3.5 |
| Water | 24.6 |

[1] 5.25 parts starch.

In the preparation of the coating composition, the 15% starch solution is prepared by heating the starch in water until a temperature of 190° F. has been reached. This produces a starch gel which has binding properties. The temperature of the gel is reduced to about 140° F., and the remaining ingredients are stirred in. The reduction of temperature is necessary in order to avoid the gelling of the dry starch, which would increase the viscosity of the coating composition to the point where application with conventional spraying equipment would be impossible. The amount of water added will vary depending upon the mode of application of the coating composition to the fiberboard. The quantity given above is for the preparation of a coating for pressure spray application.

The preferred starch is converted coating starch, a chlorinated starch such as Penick & Ford Company's T. S. C. starch. Other so-called "thin boiling starches" may be substituted. Pearl starch may be used, particularly in the preparation of the starch solution or gel; but for spray application, the use of large quantities of such starch would produce too viscous a composition unless the solids content were lowered by the addition of large quantities of water. This may be objectionable in some instances; and for such reason the thin boiling starches are preferred, at least for the dry starch content. However, all of the starch may be gelled and the coating applied by roll coater or reduced in viscosity with additional water and applied by brush, for instance. Where an extraneous binder is used, none of the starch need be gelled. The starch is defined as an amylaceous material selected from the group consisting of thin boiling starch, pearl starch, and mixtures thereof.

The total starch content to the monocalcium phosphate should fall in the range between three parts of starch to one of monocalcium phosphate as the maximum starch content and one part starch to one of monocalcium phosphate as the minimum starch content. The optimum starch content is two parts for each one part of monocalcium phosphate.

Titanium dioxide is a suitable pigment where a white coating composition is desired. A diatomaceous earth filler, such as Celite 110, may be used. This is a porous filler, which facilitates drying of the coating composition. Any inorganic pigments and fillers may be substituted. Where a decorative surface is not essential, the fillers and pigments may be eliminated.

The phosphoric acid component is not critical. It serves as an additional fireproofing agent for the starch and may be incorporated in large quantities without deleterious results. Where cost is an important factor, the amount of phosphoric acid used, if any, will be relatively small.

The monocalcium phosphate in the dispersion is unreacted and is chemically stable in the dispersion.

The above coating composition when applied at the rate of 20 grams per square foot to an insulating fiberboard formed, for example, from southern pine wood fibers will render the product sufficiently fire-retardant to meet Class F of "Federal Specification CS42–49," dated November 1949, and entitled "Structural Fiber Insulating Board," when tested in accordance with the procedure outlined in Paragraph 6.2.9 of that specification.

For acoustical materials having perforations at the surface thereof, which materials are to be rendered sufficiently fire-retardant to meet "Federal Specification SSA–118a," dated February 12, 1948, and entitled "Acoustical Units: Prefabricated," it is preferred to add to the starch monocalcium phosphate coating an intumescent resin phosphoric acid component which serves to increase the fire-resistant characteristics of the coating composition and provides added intumescence which will cause the coating composition to bridge effectively the perforations in the material when intumescence and coking result from the application of flame to the coating.

The following is an example of a coating composition suitable for application to perforated acoustical fiberboard units:

*Example II*

| | Parts by weight |
|---|---|
| 15% starch solution | 20.9 |
| Dry ungelled starch | 17.7 |
| Monocalcium phosphate | 10.4 |
| Water | 19.8 |
| Resin solution | 13.5 |
| Pigment | 2.6 |
| Filler | 3.5 |
| Water | 11.6 |

In this example, the starch solution or gel is prepared in the manner described above; and the dry starch, monocalcium phosphate, and water are added after the starch solution has been reduced below 140° F.

The resin solution is prepared by mixing together:

| | Parts by weight |
|---|---|
| Formaldehyde (37% solution) | 71 |
| Dicyandiamide | 22 |
| Phosphoric acid | 7 |

Preferred practice is to mix the formaldehyde and dicyandiamide together for about two minutes and then add the phosphoric acid. It serves as a catalyst for the reaction. The reaction between the formaldehyde and dicyandiamide is continued until a clear solution is obtained. The reaction vessel is jacketed; and cooling water is applied to maintain the temperature of the reaction below about 120° F., and preferably at a temperature of about 90° F. to 105° F. With a batch such as referred to above, the reaction will be effected in about one hour's time. In place of formaldehyde other aldehyde-yielding substances may be substituted; such, for example, as acetaldehyde, paraformaldehyde, benzaldehyde, and hexamethylenetetramine; and the term "aldehyde" is used in the claims to cover all such aldehyde-yielding substances. There should be sufficient aldehyde to combine with substantially all of the dicyandiamide, but an excess of aldehyde may be present without deleterious results.

The resin solution is mixed in with the starch-monocalcium phosphate mixture, and the filler and pigments are added. The necessary amount of water to provide the desired viscosity for application is incorporated. In the above example, the quantity of water added has been sufficient to produce a composition suitable for pressure spray application.

The ratio of the starch-monocalcium phosphate mixture to resin solution is not critical; and, as indicated above by Example I, the resin may be eliminated entirely for some uses. Likewise, the resin alone may serve as the binder, the gelled starch being omitted from the composition. Obviously, other binders may be employed to supplement the dicyandiamide - aldehyde resin binder. The resin serves primarily as an intumescent, fire-resistant component and a subsidiary binder. On a dry basis the preferred range is between 15 and 40 parts of resin for each 100 parts of the starch-monocalcium phosphate mixture.

The amount of phosphoric acid to be used with the resin is not critical, although it does play a major role in providing intumescence in the dicyandiamide-aldehyde resin. Preferably it is incorporated in the range of 15 to 100 parts for each 100 parts of dicyandiamide.

The preferred range of starch to monocalcium phosphate in the coating composition including the resin-phosphoric acid component is somewhat narrower than with the composition of Example I and falls between 2.6 parts of starch to 1 part of monocalcium phosphate as a maximum and 1.5 parts of starch to 1 part of monocalcium phosphate as a minimum. This provides, in combination with the intumescent, resin-phosphoric acid component, adequate bridging characteristics for perforated acoustical unit use.

When 25 to 27 grams of the coating composition of Example II are applied per square foot to a perforated fiberboard acoustical unit, the same will meet the requirements of Section E3c of "Federal Specification SSA–118a" when tested in accordance with the procedure outlined in F–3c of the specification. The coating does not substantially reduce the sound-absorption efficiency of the product; and when dried at a temperature in the order of 325° F., the surface is tack-free, smooth, and free of checks or cracks.

The other resin binders mentioned above are not in and of themselves intumescent; and where such intumescence in the binder component of the composition is important, the dicyandiamide-formaldehyde binder will be selected.

Where the surface coated with the fire-resistant coating must possess washability, the following formula which includes additional phosphoric acid may be employed and washability deveolped by heating the coating on the treated surface at about 350° F. for about four minutes.

*Example III*

| | Parts by weight |
|---|---|
| Monocalcium phosphate | 72.0 |
| Phosphoric acid | 17.5 |
| Dowicide G (sodium pentachlorophenate) | 1.6 |
| Water | 70.0 |
| 15% starch solution | 83.6 |
| 50% titanium dioxide dispersion | 15.0 |
| Iceberg clay | 22.5 |
| Pine oil | 1.6 |
| Dispersing agent | 1.2 |
| Dry ungelled starch | 73.0 |
| Dicyandiamine-aldehyde resin solution | 54.3 |
| Water | 30.0 |

The 15% starch solution will be prepared in the same manner as given in Examples I and II, as by mixing 12.6 parts of chlorinated starch with 71 parts of water, heating to 190° F., and cooling to about 120° F. The titanium dioxide solution will be prepared by mixing 250 pounds of titanium dioxide, 37 gallons of water, and 2 pounds of a dispersing agent, such as Quadrofos which is a sodium tetraphosphate. Thorough stirring will be effected to obtain a uniform dispersion of the titanium dioxide in the water. The dicyandiamide-aldehyde resin solution will be prepared in the manner given in Example II from 12 parts of dicyandiamide, 38.5 parts of formaldehyde, and 3.8 parts of phosphoric acid. The additional 17.5 parts of phosphoric acid in this example appear to have a peptizing action on the monocalcium phosphate-starch dispersion; and when the coating is heated to 350° F. for about four minutes, as mentioned above, good washability is obtained in the dried coating.

When 25 grams of the coating composition of Example III are applied per square foot to a perforated fiberboard acoustical unit, the same will meet the requirements of Section E–3c of "Federal Specification SSA–118a" when tested in accordance with the procedure outlined in F–3c of the specification. The coating does not substantially reduce the sound-absorption efficiency of the product; and when dried at a temperature in the order of 350° F. for about four minutes, the surface is not only tack-free, smooth, and free from checks or cracks, but will also meet the washability requirements of "Federal Specification TTP–88a."

In all instances the mixture of ingredients includes monocalcium phosphate and starch. Because of the reactivity of the calcium phosphate with alkaline materials to produce gases, the composition must be substantially free of any such alkaline ingredients which would so react with the monocalcium phosphate, for when the monocalcium phosphate is thus reacted, the effectiveness of the fire-resistant coating composition is lost.

This application is a continuation-in-part of my application Serial No. 177,759, filed August 4, 1950, and entitled "Fire-Resistant Coating Composition for Fiberboard and the Like," now abandoned.

I claim:

1. A fire-resistant coating composition for fiberboard and the like comprising a water dispersion of (1) monocalcium phosphate which is unreacted and chemically stable in said dispersion, (2) from 1 to 3 parts by weight of an amylaceous material selected from the group consisting of thin boiling starch, pearl starch, and mixtures thereof for each part by weight of unreacted monocalcium phosphate, and (3) a dicyandiamide-aldehyde resin.

2. A fire-resistant coating composition in accordance with claim 1 including phosphoric acid.

3. A fire-resistant coating composition for fiberboard and the like comprising a water dispersion of (1) monocalcium phosphate which is unreacted and chemically stable in said dispersion, (2) from 1 to 3 parts by weight of an amylaceous material selected from the group consisting of thin boiling starch, pearl starch, and mixtures thereof for each part by weight of unreacted monocalcium phosphate, a portion at least of said starch being heat gelled and constituting a binder for said coating composition, and (3) a dicyandiamide-aldehyde resin.

4. A fire-resistant coating composition for fiberboard and the like comprising a water dispersion of (1) monocalcium phosphate which is unreacted and chemically stable in said dispersion, (2) from 1 to 3 parts by weight of an amylaceous material selected from the group consisting of thin boiling starch, pearl starch, and mixtures thereof for each part by weight of unreacted monocalcium phosphate, (3) a dicyandiamide-aldehyde resin, and (4) phosphoric acid.

5. A fire-resistant coating composition for fiberboard and the like comprising a water dispersion of (1) monocalcium phosphate which is unreacted and chemically stable in said dispersion, (2) from 1.5 to 2.6 parts by weight of an amylaceous material selected from the group consisting of thin boiling starch, pearl starch, and mixtures thereof for each part by weight of unreacted monocalcium phosphate, (3) a dicyandiamide-aldehyde resin, and (4) phosphoric acid.

6. A fire-resistant coating composition for fiberboard and the like comprising a water dispersion of (1) about 1 part by weight of monocalcium phosphate which is unreacted and chemically stable in said dispersion, (2) about 2 parts by weight of an amylaceous material selected from the group consisting of thin boiling starch, pearl starch, and mixtures thereof for each part by weight of unreacted monocalcium phosphate, (3) a resin comprising the reaction product of (a) 2.2 parts by weight of dicyandiamide, (b) 7.1 parts by weight of formaldehyde, and (c) .7 part by weight of phosphoric acid, and (4) sufficient water to form a coating composition of the desired consistency.

7. A method of treating organic fibrous material to render the same fire-resistant comprising applying to said material a composition comprising a water dispersion of (1) monocalcium phosphate which is unreacted and chemically stable in said dispersion and (2) from 1 to 3 parts by weight of an amylaceous material selected from the group consisting of thin boiling starch, pearl starch, and mixtures thereof for each part by weight of unreacted monocalcium phosphate, and removing water from said composition to bond the dried residue of said composition to said material.

8. A method of treating organic fibrous material to render the same fire-resistant comprising applying to said material a composition comprising a water dispersion of (1) monocalcium phosphate which is unreacted and chemically stable in said dispersion, (2) from 1 to 3 parts by weight of an amylaceous material selected from the group consisting of thin boiling starch, pearl starch, and mixtures thereof for each part by weight of unreacted monocalcium phosphate, and (3) a binder, and applying heat to said coating composition to remove water therefrom and to activate said binder to bond the dried residue of said coating composition to said material.

9. A method of treating fiberboard and the like to render the same fire-resistant comprising applying to a surface of said material a composition comprising a water dispersion of (1) monocalcium phosphate which is unreacted and chemically stable in said dispersion, (2) from 1 to 3 parts by weight of an amylaceous material selected from the group consisting of thin boiling starch, pearl starch, and mixtures thereof for each part by weight of unreacted monocalcium phosphate, and (3) a resinous binder selected from the group consisting of dicyandiamide aldehyde, urea aldehyde, phenol aldehyde, and melamine aldehyde, and heating said coated material by exposing the coating composition to a temperature the equivalent of about 350° F. for about four minutes to remove water therefrom, activate said resinous binder, and render said coating composition washable.

LEWIS W. ECKERT.

REFERENCES CITED

The following references are of record in the file of this patent:

UNITED STATES PATENTS

| Number | Name | Date |
|---|---|---|
| Re. 2,979 | Horsford | June 9, 1868 |
| 1,113,632 | Holbrook | Oct. 13, 1914 |
| 2,131,433 | Fiske | Sept. 27, 1938 |
| 2,452,055 | Jones | Oct. 26, 1948 |

FOREIGN PATENTS

| Number | Country | Date |
|---|---|---|
| 924 | Great Britain | Mar. 27, 1869 |